United States Patent
Råheim et al.

(10) Patent No.: US 12,253,022 B2
(45) Date of Patent: Mar. 18, 2025

(54) HYDROGEN-FUELLED GAS TURBINE POWER SYSTEM AND METHOD FOR ITS OPERATION

(71) Applicant: ZEG Power AS, Fornebu (NO)

(72) Inventors: Arne Råheim, Maura (NO); Nicola Di Giulio, Oslo (NO); Kathrine Ryengen, Slattum (NO); Fredrik Mowill, Oslo (NO)

(73) Assignee: ZEG POWER AS, Fornebu (NO)

( * ) Notice: Subject to any disclaimer, the term of this patent is extended or adjusted under 35 U.S.C. 154(b) by 467 days.

(21) Appl. No.: 17/637,589

(22) PCT Filed: Aug. 19, 2020

(86) PCT No.: PCT/NO2020/050208
§ 371 (c)(1),
(2) Date: Feb. 23, 2022

(87) PCT Pub. No.: WO2021/040528
PCT Pub. Date: Mar. 4, 2021

(65) Prior Publication Data
US 2022/0275753 A1  Sep. 1, 2022

(30) Foreign Application Priority Data
Aug. 28, 2019 (NO) .................................. 20191038

(51) Int. Cl.
*F02C 3/22* (2006.01)
*C01B 3/16* (2006.01)
(Continued)

(52) U.S. Cl.
CPC ................. *F02C 3/22* (2013.01); *C01B 3/16* (2013.01); *C01B 3/38* (2013.01); *F02C 6/18* (2013.01);
(Continued)

(58) Field of Classification Search
CPC ...... F02C 3/22; F02C 3/30; F02C 6/18; F02C 7/141; F05D 2220/722; F05D 2240/35;
(Continued)

(56) References Cited

U.S. PATENT DOCUMENTS 4,166,362 A * 9/1979 Laurent ................. F01K 25/085
60/671
5,490,377 A 2/1996 Janes
(Continued)

FOREIGN PATENT DOCUMENTS

JP 2019523541 A 8/2019
WO 2018012984 A1 1/2018
(Continued)

OTHER PUBLICATIONS

Written Opinion and Search Report of the International Search Authority for International Application No. PCT/NO2020/050208; International Filing Date: Aug. 19, 2020; Date of mailing: Oct. 23, 2020; 9 pages.

*Primary Examiner* — Alain Chau
*Assistant Examiner* — Sean V Meiller
(74) *Attorney, Agent, or Firm* — CANTOR COLBURN LLP (57) ABSTRACT

Hydrogen-fueled gas turbine power system comprising a compressor (22), a combustor (24) and a turbine (26) as well as a fuel supply device (10). The fuel supply device (10) has the form of a hydrogen gas producing reactor system with at least one reactor (12) based on sorption enhanced steam methane reforming (SE-SMR) and/or sorption enhanced water gas shift (SE-WGS) of syngas. The reactor (12) is connected in a closed loop with a regenerator (14) for circulating and regenerating a $CO_2$ absorber between the reactor (12) and the regenerator (14). Additionally, there is a closed heat exchange loop (21) between the regenerator (14) of the hydrogen gas producing reactor system (10) and
(Continued)

the downstream end of the combustor (24) or the upstream end of the turbine (26). A method of its use is also contemplated.

20 Claims, 7 Drawing Sheets (51) Int. Cl.
*C01B 3/38* (2006.01)
*F02C 6/18* (2006.01)
*F02C 7/141* (2006.01)

(52) U.S. Cl.
CPC ...... *F02C 7/141* (2013.01); *C01B 2203/0233* (2013.01); *C01B 2203/0425* (2013.01); *C01B 2203/0475* (2013.01); *C01B 2203/0838* (2013.01); *C01B 2203/84* (2013.01); *C01B 2203/86* (2013.01); *F05D 2220/722* (2013.01); *F05D 2240/35* (2013.01); *F05D 2260/213* (2013.01); *F05D 2260/61* (2013.01)

(58) Field of Classification Search
CPC ........... F05D 2260/213; F05D 2260/61; C01B 3/0005; C01B 3/001; C01B 3/14; C01B 3/16; C01B 3/22; C01B 3/24; C01B 3/26; C01B 3/32; C01B 3/323; C01B 2203/0233; C01B 2203/042; C01B 2203/0425; C01B 2203/043; C01B 2203/0475; C01B 2203/0811; C01B 2203/82; C01B 2203/84; C01B 2203/86
See application file for complete search history.

(56) References Cited

U.S. PATENT DOCUMENTS

| | | | |
|---|---|---|---|
| 5,590,518 A * | 1/1997 | Janes | F02C 7/224 60/39.12 |
| 7,926,292 B2 * | 4/2011 | Rabovitser | F02C 6/18 60/730 |
| 11,890,576 B2 * | 2/2024 | Chen | B01D 53/52 |
| 2005/0201929 A1 | 9/2005 | Hiershkowitz et al. | |
| 2007/0130957 A1 | 6/2007 | Hoffman | |
| 2008/0141643 A1 | 6/2008 | Varatharajan et al. | |
| 2008/0155984 A1 | 7/2008 | Liu et al. | |
| 2008/0161428 A1 | 7/2008 | Strait | |
| 2018/0214815 A1 | 8/2018 | Keefer et al. | |
| 2019/0010412 A1 | 1/2019 | Moghtaderi et al. | |

FOREIGN PATENT DOCUMENTS

| | | |
|---|---|---|
| WO | 2018148514 A1 | 8/2018 |
| WO | 2020165440 A1 | 8/2020 |

* cited by examiner

HYDROGEN-FUELLED GAS TURBINE POWER SYSTEM AND METHOD FOR ITS OPERATION

CROSS REFERENCE TO RELATED APPLICATIONS

This application is a National Stage application of PCT/NO2020/050208, filed Aug. 19, 2020, which claims the benefit of Norwegian application Ser. No. 20/191,038, filed Aug. 28, 2019, both of which are incorporated by reference in their entirety herein.

The present invention concerns hydrogen-fueled gas turbine power system as indicated by the preamble of claim 1. According to another aspect the invention concerns a method for generating power in a hydrogen-fueled gas turbine power plant as indicated by the preamble of claim 10.

BACKGROUND

Carbon Capture and Storage (CCS) constitutes a range of technologies being developed to help mitigate the negative consequences of human made climate change by isolating $CO_2$ produced during fuel combustion (e.g., gas, liquid hydrocarbons, coal and biomass) and from $CO_2$ emitting industries (iron and steel, aluminium, silicon, ferrosilicon, cement, etc.). $CO_2$ capture can be obtained by three main methods; post-combustion, pre-combustion and combustion in almost pure oxygen. The separated $CO_2$ stream can be used and/or contained in geological formations.

In a pre-combustion situation, hydrogen or hydrogen rich gases have historically led to combustion temperatures that are too high for conventional gas turbines.

However, recent technology development (premixing of fuel and air, development of burners for hydrogen rich fuels, development of higher temperature material system (base alloy/super alloys, bond coat and thermal barrier coatings)) has made pre-combustion $CO_2$ capture viable for the use in hydrogen-fueled gas turbines.

Hydrogen-fuel can be made efficiently (in one process step) from cleaned, desulphurized syngas (of any origin) or natural gas and water by processes known as; Sorption Enhanced Water Gas Shift (SE-WGS) and/or Sorption Enhanced Steam Methane Reforming (SE-SMR), also called Sorption Enhanced Reforming (SER), characterized by using CaO as the $CO_2$-absorbent (ref. WO 2011/078681 A1 and U.S. Department of energy), also called Ca-looping (Dean at al.: 2011), when used in post-combustion cases (EP 1 495 794 A1).

The following reactions occur (depending on the fuel used);
a) Hydrogen produced form syngas (gas with variable amounts of Hydrogen and CO), Sorption Enhanced Water Gas Shift (SE-WGS) exemplified by the following reaction: $CaO+CO+H_2+H_2O=CaCO_3+2H_2$
b) Hydrogen produced from natural gas (mainly $CH_4$), Sorption Enhanced Steam Reforming (SE-SMR): $CaO+CH_4+2H_2O=CaCO_3+4H_2$
c) Hydrogen produced from a mixture of syn gas and natural gas (or methane rich gas) would occur according to the following "equation" (not balanced): $CaO+CO+H_2+CH_4+H_2O=CaCO_3+H_2$ The temperature for all reactions is between 500 to 650° C. These reactions are slightly exothermic and may have to be cooled by adding water or heat exchange. Reaction c) represents the sum of reactions a) and b). All reactions would lead to the same products (calcite and hydrogen), regardless of the proportions of the syngas and natural gas in the fuel mix introduced to the hydrogen production unit, if the amount of the $CaO-CO_2$ absorbent is high enough to accommodate all the carbon in the reaction.

Included in the hydrogen production unit is a $CO_2$ absorbent regenerator (calciner), where the solid calcium carbonate ($CaCO_3$) from the hydrogen production process is regenerated according to the following reaction: $CaCO_3=CaO+CO_2$. If no hydrocarbon fuel (or fuel containing CO) is used to perform this highly endothermic process (about 850 to 950° C. is needed), the total amount of $CO_2$ is captured "100% pure" and can be used and/or stored.

It is very important to perform this endothermic regeneration process in a sustainable cost and energy efficient manner. This can be achieved by providing heat, or waste heat, that can be transferred in two different ways, i.e. directly or indirectly. Direct heat transfer involves an oxy-combustion of fuel; therefore, the use of an air separation unit (ASU) is required. Indirect heat exchange requires the integration of a high temperature heat exchanger in the regenerator. The heat could be taken from a high temperature fuel cell (SOFC) (as in WO 2011/078681 A1).

Other publications in this technical area worth mentioning are US 2008/155984 A1, US 2007/0130957 A1, US 2008/0141643 A1, US 2008/0161428 A1, and U.S. Pat. No. 5,490,377 A.

Another option would be to use a high temperature electrical power generating device to calcine the calcium carbonate as have been very briefly suggested in WO01/42132 A1. However, this publication is silent with regard to how such a calcination should be performed.

While conventional natural gas turbines may give too low temperatures for efficient performance of the regeneration reaction of the $CaO-CO_2$ absorbent, the challenging high temperature in the combustor end and the inlet of the turbine of a hydrogen-fueled gas turbine, might on the other hand benefit from the cooling caused by an efficient heat exchange loop.

OBJECTIVE

The objective of the present invention is to provide a cost and energy efficient hydrogen-fueled gas turbine power plant able to operate under sustainable conditions. It is a derived object to alleviate the problem of excessive temperature at the end of the combustor and/or the inlet of the hydrogen-fueled gas turbine.

It is further a derived object to provide a method for operation of such a power plant.

It is an inherent objective to provide such a power plant in which $CO_2$ is captured in a highly effective manner.

THE PRESENT INVENTION

The above-mentioned objects are achieved by the present invention which according to a first aspect consists in a hydrogen-fueled gas turbine power plant as defined by claim 1

According to another aspect the invention concerns a method as defined by claim 10.

Preferred embodiments are disclosed by dependant claims.

Sustainability is a keyword and a common denominator for the overall process illustrated by the fact that the present invention allows integrated $CO_2$ capture. The heat transfer loop, between—on one side—the end of the of the combustor and/or the inlet of the turbine of the hydrogen-fueled gas turbine and—on the other side—the regenerator (calciner), comprises a hollow ring shaped compartment at the downstream end of the combustor or at the inlet of the turbine. The heat transfer medium can be different gases, such as for example; hydrogen, water vapour, $CO_2$, air, helium, different gas mixtures or fluids such as mineral oils, hydrocarbons and different types of molten salts.

Thus, according to the present invention the high temperature required for the regeneration of the CaO-absorbent is ensured by a specifically designed heat exchange loop between the downstream (hot) end of the combustor or the upstream end of the turbine of a hydrogen-fueled gas turbine, where the temperature may reach 1800 to 1900° C., and the regenerator of the CaO absorbent.

It is worth mentioning that gas turbines, including hydrogen-fueled gas turbines, encompasses a number of different configurations and overall designs, and that the present invention is adaptable to all these configurations and designs. For instance, with regard to the combustor chamber (s) of the gas turbines, it or they may in some embodiments be shaped as an annular chamber between the compressor and the turbine and having an axis common with the axis of the compressor and the turbine. In other embodiments the combustor chamber may be divided into two or more separate combustor chambers, each of which being positioned off-set the axis of the compressor and turbine. Thus, two, three or four separate can combustor chambers may be arranged in parallel around the axis connecting the compressor with the turbine.

FURTHER DETAILS OF THE PRESENT INVENTION

Different embodiments of the invention are illustrated below with reference to the enclosed drawings, where.

Figure 1:
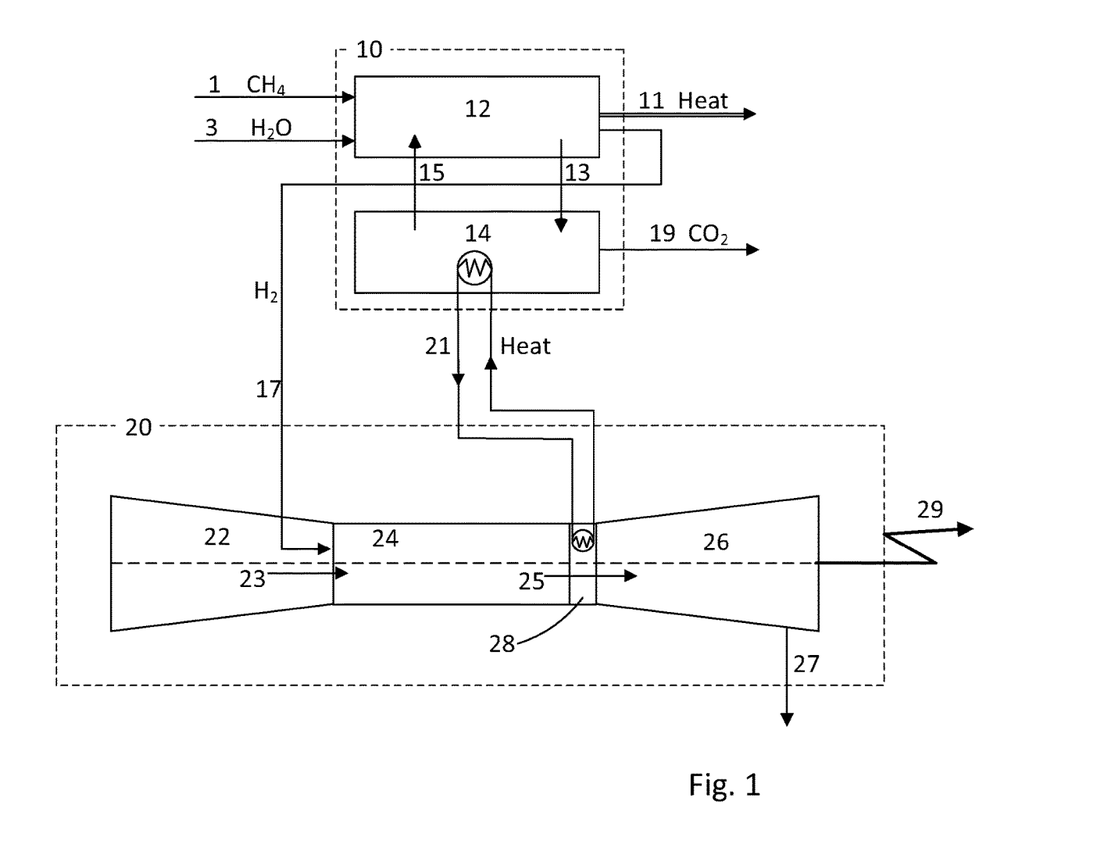
FIG. 1 is a schematic view of the first embodiment of the present invention.

Now referring to FIG. 1, the power system is generally comprised by a hydrogen-fueled gas turbine 20 and a fuel supply device 10. The fuel supply device 10 mainly consists of i) a reactor or reformer 12 arranged to receive water 3 and a base fuel which in the embodiment of FIG. 1 is methane or a methane rich gas 1 and ii) a regenerator 14. The hydrogen-fueled gas turbine 20 is comprised by the main parts i) a compressor 22, ii) a combustor 24 (with a cylindrical compartment for heat exchange at the end) arranged to receive a flow of hydrogen 17 from the reactor 12 and compressed air 23 from the compressor 22, and iii) a turbine 26 arranged to receive high-temperature combustion gases 25 from the combustor 24 and to thereby generate electricity 29. In addition to generation of electrical energy, the turbine may also propel mechanical equipment for varying purposes.

Further to FIG. 1, the fuel reformer 10 is based on the SE-SMR (or SER) method of hydrogen production, arranged in a $CO_2$ pre-combustion situation. A CaO containing $CO_2$-absorbent regenerator 14 and an indirect heating transfer system 21 between the high temperature (downstream) end of the hydrogen-fueled gas turbine combustor 24 and the $CO_2$-absorbent regenerator 14 provides heat required for the release of $CO_2$ allowing a flow 19 of substantially pure $CO_2$ to be discharged from the regenerator 14.

The heat transferred by the indirect heat transfer system 21 is collected by a ring-shaped member 28 at the downstream end of the combustor 24 and liberated in a heat exchanger in the regenerator 14, and forms a closed heat exchange loop (21) between the regenerator (14) of the hydrogen gas producing reactor system (10) and at least one of the downstream end of the combustor (24) of the hydrogen-fueled gas turbine (20) and the upstream end of the turbine (26) of said hydrogen-fueled gas turbine.

A $CH_4$ fuel flow 1 is charged to a reactor 12 being part of the hydrogen-fuel supply system which is arranged to reform fuel and take care of $CO_2$ released in the reforming process, SE-SMR (or SER) by means of a CaO containing absorber. In the embodiment of FIG. 1, the fuel is methane or a methane-rich gas, such as natural gas. A substantially pure hydrogen 17 gas leaves the reformer unit. In the reactor 12 the process of reforming involves a reaction between fuel ($CH_4$), water (steam) and CaO in which the latter is converted to $CaCO_3$ in an exothermic reaction. The $CaCO_3$ made from the $CO_2$ in the reforming process, is subsequently regenerated to CaO in an endothermic process to be described. Water 3 in vaporized form is also charged to the reactor 12.

The substantially pure hydrogen gas 17 leaves the reformer to be charged to the combustor 24 (or combustor area) of the hydrogen-fueled gas turbine. Compressed air 23 from the compressor 22 of the hydrogen-fueled gas turbine 20 is also charged to the combustor 24. The hydrogen gas 17 and the compressed air 23 may be premixed (not shown) before being charged to the combustor 24. The mixture is burned at high temperatures, typically at about 1800 to 1900° C.

The high temperature, high-pressure gas stream 25 that enters the turbine 26 expands though the turbine to produce electricity.

As indicated above, the $CaCO_3$ 13 generated in the reformer unit needs to be regenerated to CaO 15 for reuse as $CO_2$ capturing agent in the reactor 12. This takes place in regenerator 14 forming a second part of the hydrogen-fuel supply device 10.

The regeneration of $CaCO_3$ needs a temperature of about 850 to 950° C. to operate efficiently. This is an endothermic process consuming energy. At normal pressure, the process runs at temperatures of about 870° C. and above. This is thus a preferred embodiment. The necessary energy, or heat, for this process is according to the present invention provided by the combustor 24 of the hydrogen-fueled gas turbine. A closed heat loop, using for instance hydrogen as heat transfer medium, circulating between the high temperature end of the combustor 24 and the energy demanding regenerator 14 of the fuel supply device system has two functions;

1) Supplying enough heat at about 900° C. for the regeneration of the CaO containing $CO_2$-absorbent, and 2) Help cooling the relevant turbine parts to a level acceptable for long term stable use of the hydrogen-fueled gas turbine, by reducing the need for dilution air to the turbine.

The closed loop heat exchange medium can be any medium able to handle temperatures experienced at the combustor 24 and should preferably be able to handle temperatures of about 1800 to 1900° C.

The total $CO_2$ amount from this pre-combustion $CO_2$ capture process, is released from the regenerator, captured, stored, and/or used.

The high-quality exhaust gas 27 ($N_2$, $H_2O$ and $O_2$) leaving the turbine 26 at temperatures of more than 500° C., can optionally be used for a range of purposes. The heat 11 from the exothermic SE-SMR reaction would similarly have optional use. The heat 11 may for instance be used in a gasification plant to convert solid carbonaceous material to more readily exploitable gases such as syngas or natural gas, or it may be used to preheat the air from the compressor 22.

Figure 2A:
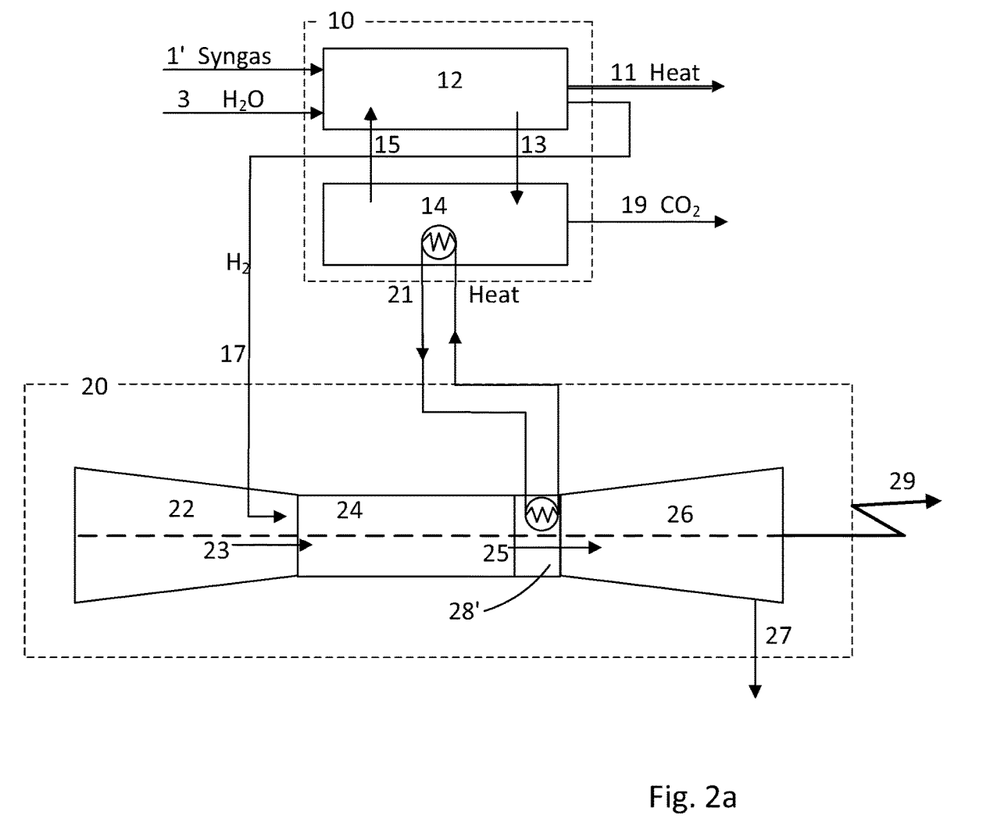
FIG. 2a is a schematic view of the second embodiment of the present invention.
Figure 2B:
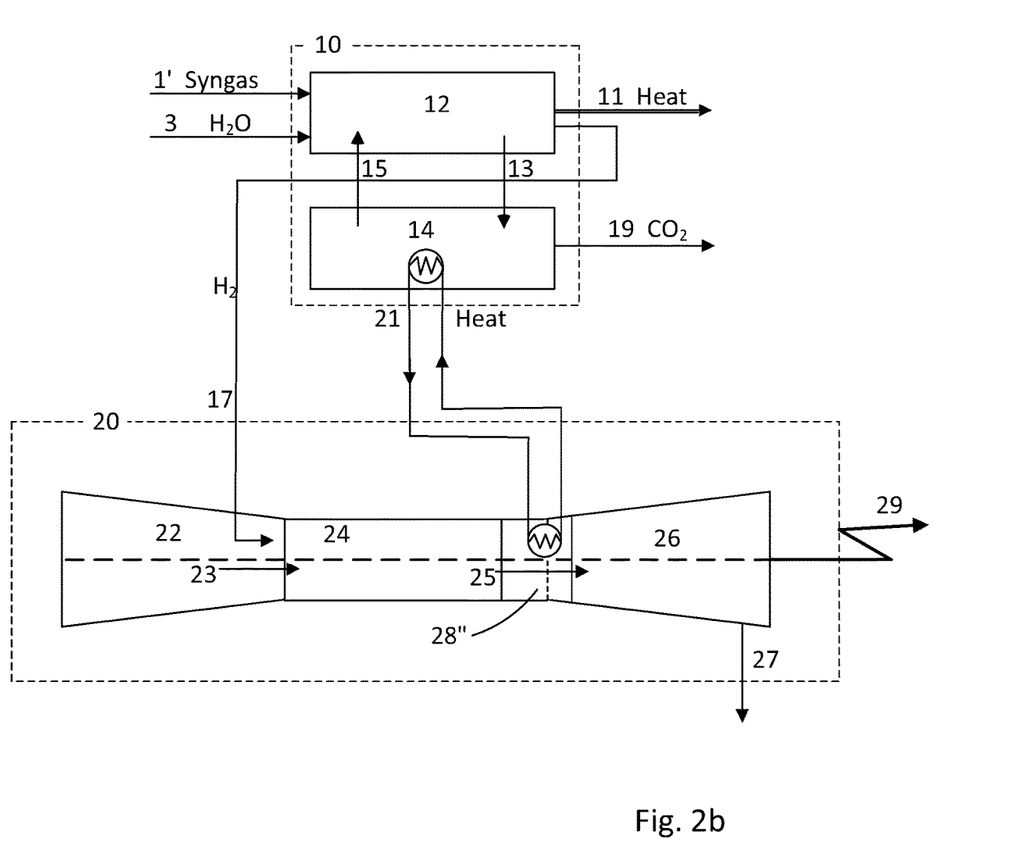
FIG. 2b is a schematic view of a variant of the second embodiment of the present invention

Attention is now directed to FIG. 2, showing a power production plant, where a hydrogen-fueled gas turbine is combined with a fuel reformer based on syngas, i.e. a SE-WGS method of hydrogen production, arranged in a $CO_2$ pre-combustion situation. A CaO containing $CO_2$-absorbent regenerator 14 and an indirect heating exchange system 21 between the hydrogen-fueled gas turbine combustor 24 and the $CO_2$-absorbent regenerator 14 provides heat for the absorbent regeneration and releases $CO_2$ 19 for $CO_2$ capture, storage, and/or usage.

Most of the components of FIG. 2a are the same as the ones in FIG. 1. A difference between FIG. 1 and FIG. 2 is mainly that the fuel 1' supplied to the hydrogen gas fuel supply device is syngas. Furthermore, the ring-shaped member 28' of the heat transfer system 21 is somewhat wider than the ring-shaped member 28 shown in FIG. 1, providing a broader contact surface area with the hot combustion gas 25 leaving the combustor 24, thereby allowing a higher rate of heat transfer.

FIG. 2b shows essentially the same as FIG. 2a, the difference being that the ring-shaped member 28" of the heat transfer system covers—or constitutes—partly a downstream area of the combustor 24, partly an upstream end of the turbine 26, thereby further increasing its contact surface area with the hot combustion gas 25.

It should be understood, that, while shown for the embodiment in which syngas is the fuel, the different embodiments of the ring-shaped member 28, 28' and 28" work equally well with natural gas as fuel or a combination of the two types of fuel.

Figure 3:
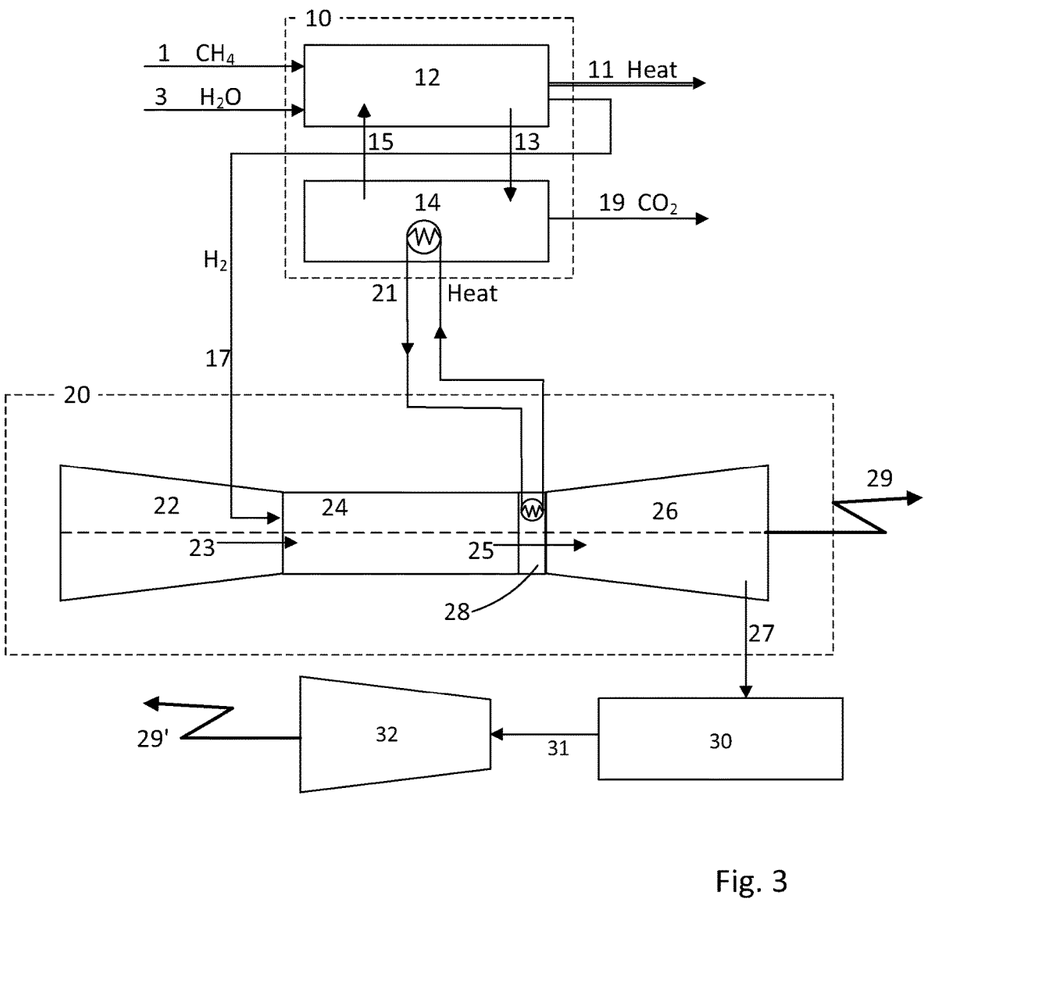
FIG. 3 is a schematic view of the third embodiment of the present invention.

Attention is now drawn to FIG. 3 showing a power production plant, where hydrogen in a pre-combustion situation is produced by the SE-SMR hydrogen production method for use in a hydrogen-fueled gas turbine. The heat from the hot exhaust gas leaving the turbine is in this embodiment recovered for high-pressure steam generation for production of additional power/electricity 29' by a steam turbine 32.

Most of the components of FIG. 3 are the same as the ones in FIG. 1. The difference between FIG. 1 and FIG. 3 is mainly that additional electric power is generated by a steam turbine 32, a configuration called a combined cycle. For this purpose, the hot exhaust gas leaving the turbine 26 is used to generate steam in a steam generator 30 and the steam generated is charged to the steam turbine 32.

Figure 4:
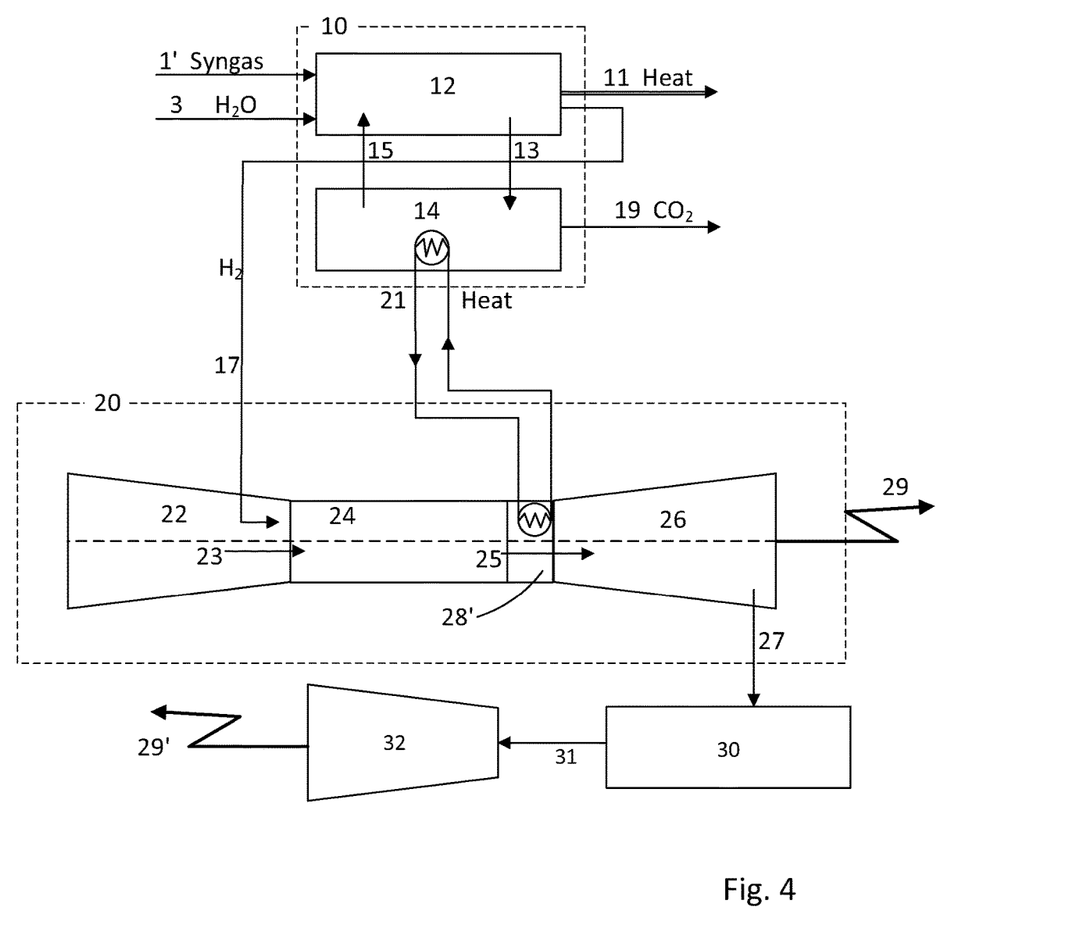
FIG. 4 is a schematic view of the fourth embodiment of the present invention.

Attention is now directed to FIG. 4 showing a power production plant, where hydrogen in a pre-combustion situation is produced from syngas, in a SE-WGS hydrogen production method, for use in a hydrogen-fueled gas turbine as previously discussed. The heat from the hot exhaust gas 27 leaving the turbine 26 is in this embodiment recovered for high-pressure steam generation for production of additional power/electricity by a steam turbine.

Most of the components of FIG. 4 are the same as the ones in FIGS. 2a and 2b. The difference between FIG. 2b and FIG. 4 is mainly that additional electric power 29' is generated by a steam generator 30 in combination with a steam turbine 32, a configuration called a combined cycle, as already discussed with reference to FIG. 3.

It should be emphasized that all embodiments described herein could encompass the additional step of power generation described with reference to FIGS. 3 and 4.

Figure 5:
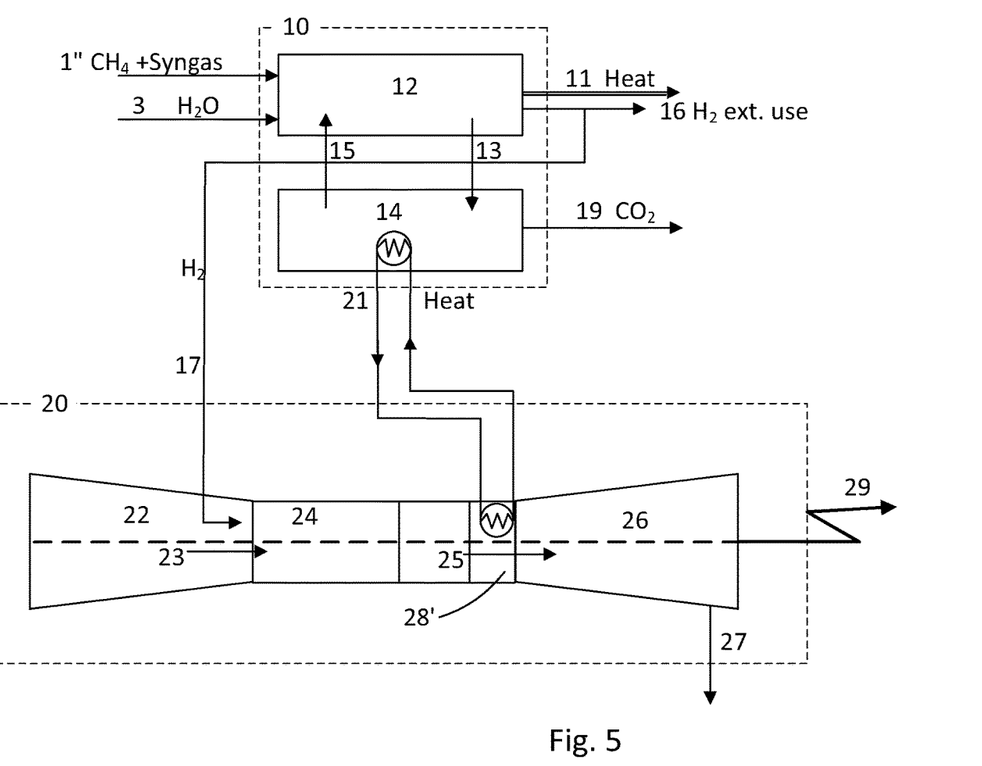
FIG. 5 is a schematic view of the fifth embodiment of the present invention.

Attention is then directed to FIG. 5 showing a power production plant, where hydrogen in a pre-combustion situation can be produced alternatively from a source of natural gas (or methane) by the SE-SMR hydrogen production method, or from a source of syngas by the SE-WGS hydrogen production method, or from any combination of such sources for use in a hydrogen-fueled gas turbine. The CaO containing $CO_2$-absorbent regenerator 14 and an indirect heating transfer system 21 between the hydrogen-fueled gas turbine combustor 24 and the $CO_2$-absorbent regenerator 14 provides heat for the CaO regeneration and release of $CO_2$ for capture, storage, and/or use as discussed with reference to previous embodiments. The system for CO2-capture is the same as described in all previous embodiments.

In FIG. 5, a common reactor/reformer 12 is indicated to receive the two types of source gases. This means that the SE-SMR reforming and the SE-WGS reaction are performed simultaneously in the same reactor and under the same conditions. This has been found not to constitute a problem. As an alternative, separate reactors/reformers may be used for each source gas, $CH_4$ and syngas. In a such a case, the two reactors may be connected to a common regenerator or to separate regenerators. The simplest configuration is, however the one shown.

FIG. 5 also shows a separate flow 16 of $H_2$ for external use, and illustrates the fact that the present method and device allows simultaneous production of energy in the forms of electricity, heat and high quality hydrogen.

The CaO containing absorber may simply be based on CaO from natural rocks/minerals, but it may also be a synthetically manufactured CaO containing absorber, e.g. of the kind described by WO 2011/005114. The advantage of such a synthetic absorber is that it endures a high number of cycles of regeneration without losing significant absorption ability.

Figure 6A:
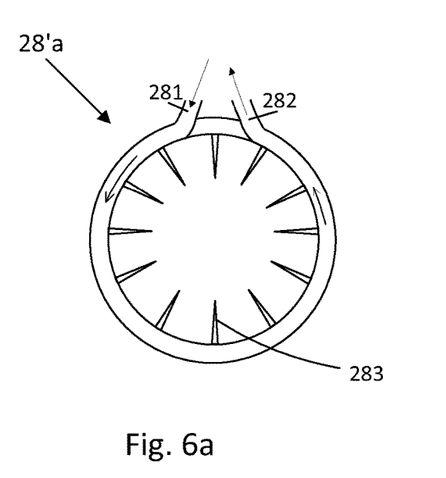
FIGS. 6a and 6b are cross-sectional views of two variants of a detail of the present invention.
Figure 6B:
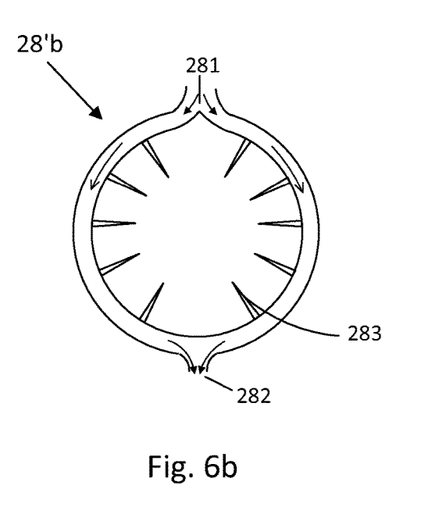

FIGS. 6a and 6b shows two alternate configurations of the ring-shaped member 28' shown in FIGS. 2a and 5. In the configuration shown in FIG. 6a, the inlet to 281 and the outlet from 282 the ring-shaped member 28'a are adjacent to one another and the heat transfer fluid flows in one nearly full circle in one and the same direction throughout the void inside the ring-shaped member. The inside of the ring-shaped member 28'a may or may not be provided with ribs 283 that serves to increase the surface area that the hot combustion gas 25 contacts on its way from the combustor 24 to the turbine 26. In the direction of the gas flow through the compressor and the turbine, such ribs may have an extension that corresponds to—or is smaller than—the extension of the ring shaped member. The size and profile of the ribs 283, if present, will be adapted to the space available. Their radial extension may vary along their length as may their thickness, to optimize not only their size but also their aerodynamic properties. Optionally, the ribs may also be slightly curved along their length in order to increase the contact with the passing gas flow. At least parts of the ribs may be located in a longitudinal area of the turbine in which no vanes are present to take up part of its cross-section.

In FIG. 6b, the inlet 281 to and outlet 282 from the ring-shaped member 28'b are located at opposite sides thereof, and the heat transfer fluid entering the void in the ring-shaped member 28'b at its inlet, is split in two partial flows that each flows a half-circle to the outlet at the opposite side of the ring-shaped member 28'b.

For all embodiments shown, the ring shaped member 28, 28' and 28" may have inlet and outlet in either of the configurations shown and even in other configurations. Furthermore, the ring-shaped member may be designed and configured in a manner making it replaceable when worn out, e.g. by being connectable to the combustor 24 and the turbine 26 by threads or the like.

The ring-shaped member 28, 28', 28", when assembled to the hydrogen-fueled gas turbine, becomes a part thereof and may be seen as the downstream end of the combustor 24, the upstream end of the turbine 26 or a connection member between the two.

The material for the ring-shaped member 28, 28', 28" is selected among materials having an acceptable heat conductivity in combination with an acceptable tolerance for high temperatures. The materials generally chosen for the wall of a combustor or turbine as described above are promising candidates therefore.

Figure 7:
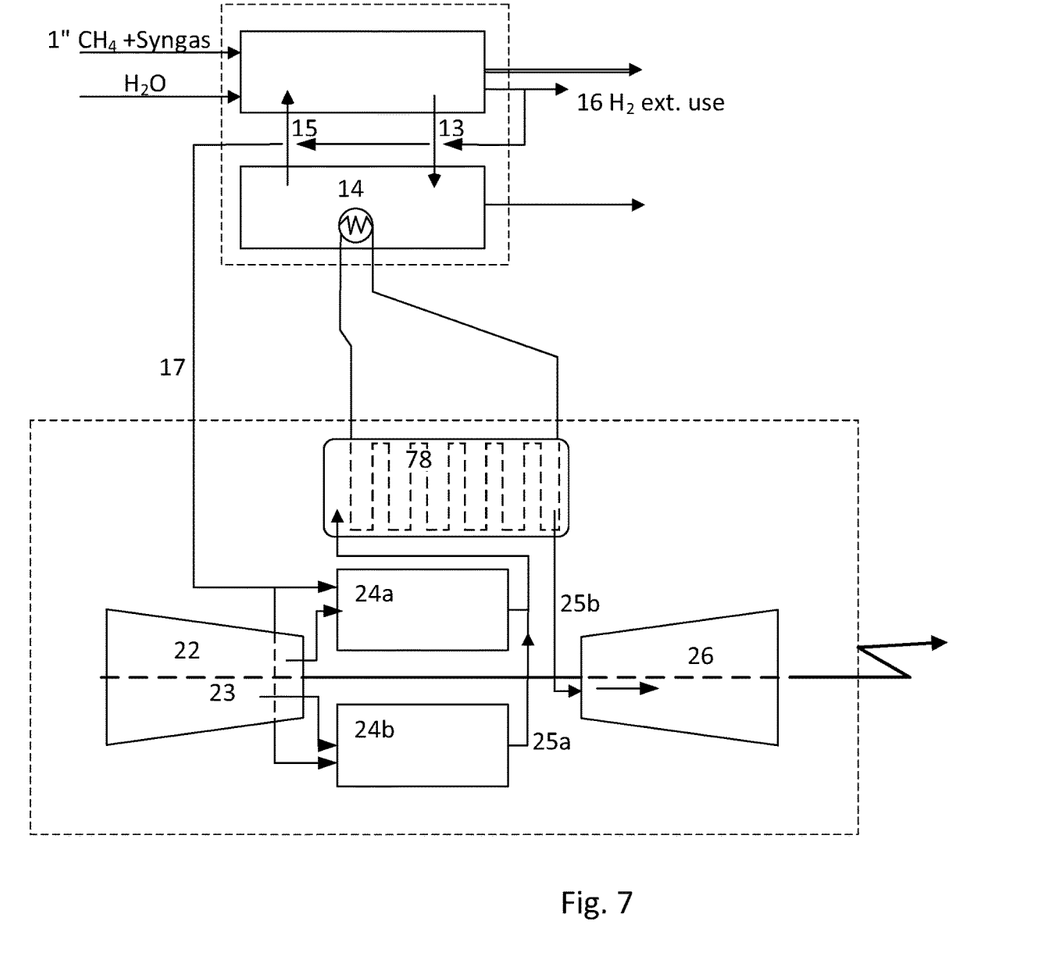
FIG. 7 is a schematic view of a sixth embodiment of the present invention.

FIG. 7 shows an embodiment of the present invention that differs from the previous embodiments with regard to the combustor which in the embodiment of FIG. 7 is comprised by two separate combustor chambers 24a, 24b which are off-set from the axis between the compressor 22 and the turbine 26. Also the heat exchange element previously represented as feature 28, 28' and 28" is replaced by a heat exchanger 78 which is also off-set the axis between the compressor and the turbine. The arrangement of the heat exchanger 78 off-set from said axis implies that it does not contribute to an increase of the length dimension of the turbine, and it allows use of various types and sizes of heat exchange elements, thus greatly improving the versatility of the system. This combination makes it easier to design the system in a manner allowing fine tuning of the heat to be transferred to the regenerator 14. In FIG. 7, hot gas 25a is directed from the combustors 24a to the heat exchanger 78, and the same gases is discharged from the heat exchanger 78 at a somewhat lower temperature as gas flow 25b which in turn is directed into the turbine 26. Naturally, the flow path from the combustors 24a, 24b to and through the heat exchanger 78 and further on to the turbine 26, must be shaped and dimensioned to accommodate an efficient gas flow at a high rate with an acceptably low pressure drop.

With all versions of the present invention, additional heat exchange elements to those discussed, shown and/or claimed may be installed e.g. to cool hot parts more than what is achieved by the elements 28, 28', 28" or 78.

Inherent in turbine design is safety measures that is not discussed herein and mainly will be in accordance with the standard in this technology field, such as measures for immediate fuel cut off in case of load-shedding or during emergency shut-downs, in order to prevent the turbine from over-speeding. Due to the presence of significant amounts of energy accumulated in the heat exchanger during normal operation, additional safety measures may be made to prevent the turbine from over-speeding in such situations.

The present invention is a unique combination of technologies allowing an improved temperature control of the combustor and turbine of a hydrogen-fueled gas turbine power plant in a manner in which the heat removed from the combustor is utilized in the most efficient way in a regenerator for a $CO_2$ absorber in which the temperature requirement is (also) a challenge. This is achieved in a system of pre-combustion capture of $CO_2$, which is the most efficient way of capturing $CO_2$ in such a power plant. This unique combination of advantages over the prior art makes the present method and system a good example of a synergetic invention.

The invention claimed is:

1. Hydrogen-fuelled gas turbine power system with pre-combustion $CO_2$ capture, the main parts of which being comprised by a compressor (22), a combustor (24) and a turbine (26) as well as a fuel supply (10),
the turbine (26) being adapted for connection to an electrical energy power generator;
the fuel supply (10) comprising a hydrogen gas producing reactor system with at least one reactor (12) comprising i) a reactor capable of supporting sorption enhanced steam methane reforming of methane, ii) a reactor capable of supporting sorption enhanced water gas shift of syngas, or a combination thereof; and
the reactor (12) being connected in a closed loop with a regenerator (14) for circulating and regenerating a $CO_2$ absorber between the reactor (12) and the regenerator (14), characterized in the presence of a closed heat exchange loop (21) between the regenerator (14) of the hydrogen gas producing reactor system (10) and at least one of the downstream end of the combustor (24) of the hydrogen-fuelled gas turbine (20) or the upstream end of the turbine (26) of said hydrogen-fuelled gas turbine, to thereby raise the temperature in the regenerator (14) while simultaneously lowering the temperature in the upstream end of the turbine (26) of the hydrogen-fuelled gas turbine (20) and cooling relevant parts of the hydrogen-fuelled gas (20) to a level acceptable for long term stable use of the hydrogen-fuelled gas turbine.

2. Hydrogen-fuelled gas turbine power system as claimed in claim 1, wherein the reactor (12) has an inlet conduit adapted to receive a gas flow from a methane rich source, from a syngas source or from a combination of a methane rich source and a syngas source.

3. Hydrogen-fuelled gas turbine power system as claimed in claim 1, wherein the reactor (12) has an inlet conduit adapted to receive a source of steam.

4. Hydrogen-fuelled gas turbine power system as claimed in claim 1, wherein the heat exchange medium for the heat exchange system (21) is a heat exchanger able to handle temperatures up to at least 1500° C.

5. Hydrogen-fuelled gas turbine power system as claimed in claim 1, further comprising a steam generator (30) arranged to receive hot exhaust gases from the turbine and to charge steam generated therein to s steam turbine (32) for additional generation of electricity.

6. Hydrogen-fuelled gas turbine power system as claimed in claim 1 wherein the closed heat exchange loop between the regenerator (14) of the hydrogen gas producing reactor system and at least one of the downstream end of the combustor (24) of the hydrogen-fuelled gas turbine (20) power system or the upstream end of the turbine (26) of said hydrogen-fuelled gas turbine power system comprises an element (28, 28', 28") having the shape of a hollow ring with essentially the same diameter as the downstream end of combustor (24) or the upstream end of the turbine, and is arranged to be connected between and bridging the combustor (24) and the turbine (26).

7. Hydrogen-fuelled gas turbine power system as claimed in claim 6, wherein the hollow, ring shaped element (28, 28' and 28") is replaceable.

8. Hydrogen-fuelled gas turbine power system as claimed in claim 6, wherein the hollow, ring shaped element (28, 28' and 28") is provided as a series of rings of a common diameter but different widths.

9. Hydrogen-fuelled gas turbine power system as claimed in claim 1, wherein the closed heat exchange loop between the regenerator (14) of the hydrogen gas producing reactor system and at least one of the downstream end of the combustor (24) of the hydrogen-fuelled gas turbine (20) power system or the upstream end of the turbine (26) of said hydrogen-fuelled gas turbine power system comprises a dedicated heat exchanger (78) arranged to cool the exhaust from the combustor (24) before it enters the turbine (26).

10. Method for generating power in a hydrogen-fueled gas turbine power plant with pre-combustion $CO_2$ capture comprising: —feeding a gas comprising a methane rich gas, a syngas, or a combination thereof to a hydrogen gas producing reactor system with at least one reactor selected comprising i) a reactor capable of supporting sorption enhanced steam methane reforming of methane, ii) a reactor capable of supporting sorption enhanced water gas shift of syngas, or a combination thereof, converting the gas to hydrogen by a reaction comprising sorption enhanced steam methane reforming, sorption enhanced water gas shift, or a combination thereof while capturing $CO_2$ in the reactor by a natural or synthetic CaO containing $CO_2$ absorber, —recycling the $CO_2$ absorber via a step of regeneration under liberation of pure $CO_2$ at a temperature of at least 850*C, and – charging the hydrogen gas produced in the hydrogen-fueled gas producing reactor system to the combustor of a gas turbine along with compressed air and powering the turbine with the hydrogen gas charged to the combustor and the compressed air, characterized in the method further comprising-performing heat exchange with a closed heat exchange loop between the combustor and the step of regenerating the $CO_2$ absorber to thereby ensure a minimum temperature level in the step of regenerating the $CO_2$ absorber.

11. Method as claimed in claim 10, comprising controlling the heat exchange in a manner ensuring a temperature of at least 872° C. in the step of regeneration.

12. Method as claimed in claim 10, further comprising using heat developed in reactor as an energy source for external purposes.

13. Method as claimed in claim 12, comprising using the heat for gasification of solid carbonaceous material.

14. Hydrogen-fuelled gas turbine power system as claimed in claim 1, where the $CO_2$ absorber comprises a CaO containing $CO_2$ absorber.

15. Hydrogen-fueled gas turbine power system as claimed in claim 14, wherein the closed heat exchange loop is configured to raise the temperature in the regenerator (14) to 900° C.

16. Hydrogen-fuelled gas turbine power system with pre-combustion $CO_2$ capture, the main parts of which being comprised by a compressor (22), a combustor (24) and a turbine (26) as well as a fuel supply (10), the turbine (26) being adapted for connection to an electrical energy power generator;

the fuel supply (10) comprising a hydrogen gas producing reactor system with at least one reactor (12) comprising i) a reactor capable of supporting sorption enhanced steam methane reforming of methane, ii) a reactor capable of supporting sorption enhanced water gas shift of syngas, or a combination thereof; and the reactor (12) being connected in a closed loop with a regenerator (14) for circulating and regenerating a $CO_2$ absorber between the reactor (12) and the regenerator (14), characterized in the presence of a closed heat exchange loop (21) between the regenerator (14) of the hydrogen gas producing reactor system (10) and at least one of the downstream end of the combustor (24) of the hydrogen-fuelled gas turbine (20) or the upstream end of the turbine (26) of said hydrogen-fuelled gas turbine, to thereby raise the temperature in the regenerator (14) while simultaneously lowering the temperature in the upstream end of the turbine (26) of the hydrogen-fuelled gas turbine (20), wherein the closed heat exchange loop between the regenerator (14) of the hydrogen gas producing reactor system and at least one of the downstream end of the combustor (24) of the hydrogen-fuelled gas turbine (20) power system or the upstream end of the turbine (26) of said hydrogen-fuelled gas turbine power system comprises an element (28, 28', 28") arranged to be connected between and bridging the combustor (24) and the turbine (26).

17. Hydrogen-fuelled gas turbine power system as claimed in claim 16, wherein the element (28, 28', 28") has the shape of a hollow ring.

18. Hydrogen-fuelled gas turbine power system as claimed in claim 17, wherein the hollow ring has essentially the same diameter as the downstream end of combustor (24) or the upstream end of the turbine.

19. Hydrogen-fuelled gas turbine power system as claimed in claim 18, wherein the hollow, ring shaped element (28, 28' and 28") is replaceable.

20. Hydrogen-fuelled gas turbine power system as claimed in claim 18, wherein the hollow, ring shaped element (28, 28' and 28") is provided as a series of rings of a common diameter but different widths.

\* \* \* \* \*